United States Patent [19]

Foucher

[11] Patent Number: 4,496,259

[45] Date of Patent: Jan. 29, 1985

[54] CONNECTOR FOR CONNECTING TWO ROTORS TOGETHER

[75] Inventor: Gérard Foucher, Tremblay les Gonesse, France

[73] Assignee: Alsthom-Atlantique, Paris, France

[21] Appl. No.: 328,542

[22] PCT Filed: May 19, 1981

[86] PCT No.: PCT/FR81/00065

§ 371 Date: Nov. 30, 1981

§ 102(e) Date: Nov. 30, 1981

[87] PCT Pub. No.: WO81/03529

PCT Pub. Date: Dec. 10, 1981

[30] Foreign Application Priority Data

May 28, 1980 [FR] France ................. 80 11779

[51] Int. Cl.³ ............................... F16D 1/00
[52] U.S. Cl. ..................... 403/14; 403/337; 403/16; 411/55; 411/63; 411/389; 416/244 A
[58] Field of Search ........... 403/337, 336, 335, 11, 403/14, 16; 411/55, 63, 64, 426, 389; 464/138, 137, 71, 72; 416/244 A, 244 R

[56] References Cited

U.S. PATENT DOCUMENTS

| | | | |
|---|---|---|---|
| 1,665,988 | 4/1928 | Smith | 411/426 X |
| 1,960,046 | 5/1934 | Beal | |
| 2,872,227 | 2/1959 | Wachs | |
| 3,298,725 | 6/1967 | Boteler | 403/382 |
| 3,328,058 | 6/1967 | Gundlach | 403/336 |
| 3,603,626 | 9/1971 | Whiteside | 403/408 |
| 4,225,264 | 9/1980 | Coone | 403/337 |
| 4,279,530 | 7/1981 | Mullenberg | 403/337 |

FOREIGN PATENT DOCUMENTS

| | | | |
|---|---|---|---|
| 526351 | 2/1954 | Belgium | |
| 2757163 | 7/1979 | Fed. Rep. of Germany | |
| 719538 | 2/1932 | France | |
| 930500 | 1/1948 | France | |
| 1179556 | 12/1958 | France | 411/55 |
| 2322296 | 3/1977 | France | |
| 2352979 | 12/1977 | France | 411/55 |
| 122746 | 2/1919 | United Kingdom | |

Primary Examiner—Richard J. Scanlan, Jr.
Attorney, Agent, or Firm—Sughrue, Mion, Zinn, Macpeak & Seas

[57] ABSTRACT

A connector for connecting two rotors (2, 4) together, said connector having a plate (1, 3) on the end of each rotor.

It has clamping bolts (5) and a plurality of fixing components (6) for the plates (1, 3). Each fixing component (6) has a sleeve (17) cut in two. The sleeve is cylindrical on the outside and conical on the inside and is disposed in precision-reamed bores (12, 14) of the same dimensions in the two plates, the bores of one plate facing and being situated exactly adjacent to those of the other when the rotors (2, 4) are aligned. A shank (20) which has a conical portion (21) pushes back the parts of the sleeve (17) against the walls of the bores (12, 14) thus connecting the plates together without play.

In the case of normal operation, the connector has high resistance to shearing due to the fact that there are no stresses in the components (6). In the case of a torque greater than the normal torque, the parts of the sleeve 17 are deformed but can be very easily extracted. The connector is used in turbo-alternators.

2 Claims, 3 Drawing Figures

CONNECTOR FOR CONNECTING TWO ROTORS TOGETHER

BACKGROUND OF THE INVENTION

The present invention relates to a connector for connecting two rotors together, each rotor ending in a plate. Each plate has a plurality of orifices disposed around its circumference, each orifice of one plate being adjacent an orifice of the other plate and being intended to have fixing components inserted in them to connect the two plates together. Said fixing components are of a first type and of a second type. The fixing components of the first type, each are constituted by a clamping bolt whose dimensions allow it to enter with play into an orifice before machining. The orifices are located adjacent the fixing components of the second type, each of which is provided to be inserted in two precision-reamed bores of same cross-section obtained by reaming adjacent orifices and located one facing another when the clamping bolts are in place. Each fixing component of the second type has firstly, a sleeve which is cylindrical on the outside and conical on the inside and secondly a shank which has firstly a conical portion which pushes the sleeve against the walls of the precision-reamed bores, secondly a threaded portion at one end with a nut screwed onto it, said nut fixing the shank in position and thirdly an end which allows gripping.

Such a connector is described in French patent application No. 76 25 692 published under the No. 2,322,296. The axial forces are transmitted by the clamping bolts and torsion is transmitted by the shanks in the sleeves.

In the known connector, the sleeves are deformed against the walls of the precision-reamed bores by the pressure of the conical portions of the associated shanks.

Thus, during normal operation, it is possible to keep the initial alignment of the rotors.

However, because of the initial stress, the sleeves and the shanks have less initial shearing capacity. Further, to allow easy deformation of the sleeves, it is necessary to use thin sleeves.

Also, in the case where an incident occurs because the torque exceeds the value corresponding to the elastic strength of the sleeves, the sleeves are plasticly deformed and can take the form of a hand crank.

These sleeves are then very difficult to remove.

SUMMARY OF THE INVENTION

In the connector according to the invention which allows these drawbacks to be avoided, each sleeve is formed by two parts formed by longitudinal sawing, each of said parts being slightly smaller than a half cylinder so that when in position, the two parts of the sleeve are spaced apart.

The two parts of the sleeve which are pushed back by the associated shank press against the walls of the bores without deformation and if, subsequent to an incident, they are cranked, it is possible, after removing the shank, to remove the two parts of the sleeve without having to destroy them or risk damaging the bores.

According to a preferred embodiment of the invention, the further end of the shank to the screw is also threaded to allow a hub extractor to be fitted thereon to extract the shank.

The present invention will be better understood from the following description given by way of example with reference to the accompanying drawings:

DESCRIPTION OF THE PREFERRED EMBODIMENT

Figure 1:
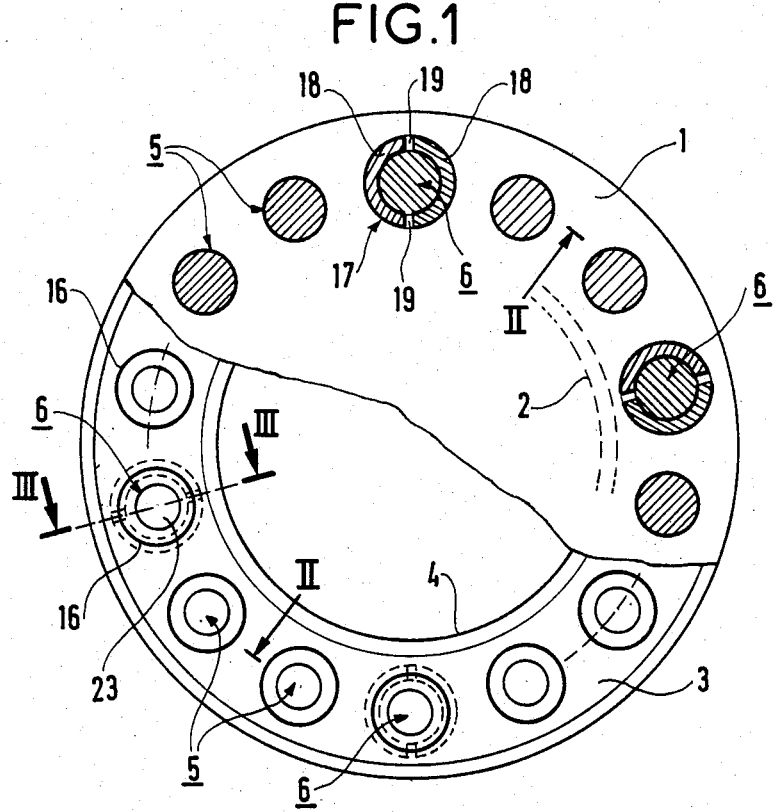
FIG. 1 is a partially cut away elevation of the connector in accordance with the invention.
Figure 2:
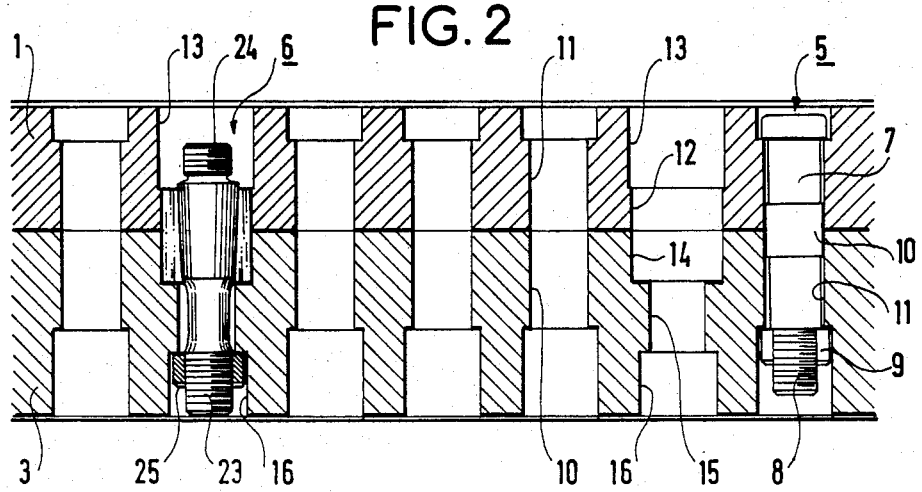
FIG. 2 is a panoramic cross-section of the bolts and fixing components.

FIG. 1 illustrates a plate 1 on the end of a rotor 2, said plate being intended to come into contact with a plate 3 on the end of a rotor 4 (see also FIG. 2). To link the two plates together, several clamping bolts 5 (fixing components of the first type) and 4 fixing components 6 (of the second type) are used. The clamping bolts 5 and the fixing components 6 are spaced out on a cylinder whose axis is the same as that of the rotors (see the panoramic cross section in FIG. 2).

FIG. 2 shows a clamping bolt 5 which has a shank 7 ending in a threaded portion 8 onto which a nut 9 is screwed. The middle of the shank 7 located across both of the plates through which it passes has a portion 10 of a diameter very close to the inside diameter of the bore in which the shank is inserted. However, to be able to insert the shank 7 it is necessary to provide for some play between the portion 10 and the bore 11.

To house the components 6, the plate 1 is provided with a precision bore 12 which communicates with the inside surface in contact with the other plate followed by a counterbore 13 whose dimensions are greater and which communicates with the outside surface of the plate 1.

A counterbore 14 is provided in the plate 3. It is located exactly opposite the counterbore 12. This first counterbore 14 communicates with a bore 15 which is narrower and ends in a second counterbore 16 which communicates with the outside surface of the plate.

Figure 3:
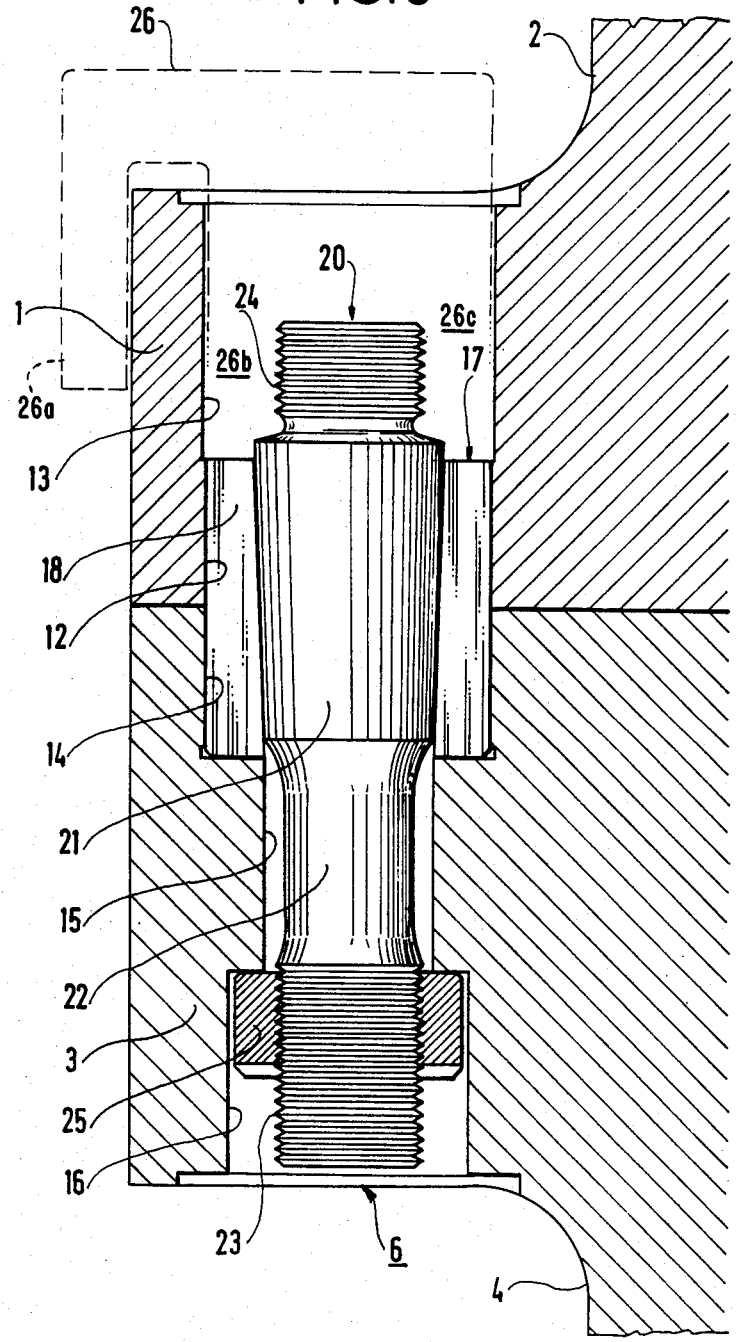
FIG. 3 is a longitudinal cross-section level with a fixing component, taken about line III of FIG. 1.

FIG. 3 shows a fixing component 6 in position. This component has a sleeve 17 sawn longitudinally in two through its axis. The two parts 18 of the sleeve 17 are equal but a portion has been removed so that when in position, the two parts 18 leave a space 19 (FIG. 1) betwee their facing edges. The sleeve parts 18 are thus, slightly less than half cylinders.

This sleeve 17 parts are semi-cylindrical on the outside and semi-conical on the inside.

The component 6 also has a shank 20 with a conical portion 21 with the same conical shape as the sleeve 17. This conical portion 21 is prolonged by a neck 22 which ends in a threaded portion 23. On the end remote from the neck 22, the conical portion ends in another threaded portion 24.

The sleeve 17 parts 18 are placed in the bores 12 and 14. The conical portion 21 of the shank 20 pushes back the two parts 18 of this sleeve 17 against the walls of the bores 12 and 14. A nut 25 which bears against the end of the counterbore 16 is screwed onto the threaded portion 23 which holds the shank 20 in position.

To connect the rotors together, the two plates 1 and 3 are disposed in parallel and the two plates are brought close to each other while ensuring that the two rotors 2 and 4 are aligned with each other.

The clamping bolts 5 are then tightened.

Once the plates are fixed together by the clamping bolts, are bore 12 and counterbore 14 are precision reamed so that they have exactly the same dimensions and are located adjacent each other. If necessary, the sleeve 17 is machined so that its outside diameter is equal to that of the bore counterbore 12 and counterbore 14. Then, the two parts 18 of the sleeve 17 are formed.

These two parts are inserted in the bore 12 and counterbore 14.

The shank 20 is then passed through the counterbore 13. A three toothed comb-shaped part 26, having teeth at 26a, 26b and 26c, is installed to provide spaces 19 between the parts 18 of the sleeve 17. The nut 25 is screwed onto the threaded portion which extends into the counterbore 16.

Screwing the nut 25 makes the conical portion 21 move forward towards the end of the counterbore 14 and moves the two parts 18 of the sleeve 17 apart. When the nut 25 is screwed, the two plates 1 and 3 are made fast by the component 6 and there is no play between the sleeve 17 and the walls of the bore 12 and counterbore 14. The comb-shaped part 26 is then removed. There are, for example, 3 or 4 components of the second type 6.

When the components 6 are in place, the rotors are connected together.

During rotation of the two rotors in normal operation, concentricity is maintained.

In the case where during operation the permissible torque is exceeded, the sleeves 17 deformed to the shape of a hand crank.

The rotors are brought out of line. To disconnect them, the components 6 must be removed. For each component, after unscrewing the nuts 25, a hub extractor is screwed onto the part 24 and, bearing on the sleeve 17, the shank 20 is removed. Therefore the shank 20 and the two parts 18 of the sleeve are very easily removed through the counterbore 13 due to the spaces 19.

I claim:

1. A connector for connecting two rotors together, said connector comprising a plate at the end of each rotor ending, each plate having a plurality of orifices disposed around its circumference, the orifices of one plate being adjacent respective orifices of the other plate, fixing components inserted in said orifices to connect the plates together, said fixing components being of a first type and of a second type, said fixing components of the first type each being constituted by a clamping bolt whose dimensions allow it to enter with play into an orifice before machining, said adjacent orifices receiving the fixing components of the second type and being provided with precision-reamed bores of the same cross-section obtained by reaming adjacent orifices, said adjacent orifices located one facing another when the clamping bolts are in place, each fixing component of the second type having firstly a pair of sleeve parts which are conical on the inside, and secondly a shank which has firstly a conical portion which pushes the sleeve parts against the walls of the precision-reamed bores, secondly a threaded portion at one end bearing a nut screwed onto it, said nut fixing the shank in position and thirdly an end which allows gripping, and wherein the sleeve parts are two parts having an axial plane of separation formed by longitudinal sawing, each of said sleeve parts being slightly smaller than a half cylinder, and said connector further comprising means for initially positioning and maintaining said two parts spaced equally apart circumferentially prior to screwing down said nut on said shank threaded portion so that when in position, the two parts of the sleeve are maintained in their spaced apart positions.

2. A connector according to claim 1, wherein the end of the shank which allows gripping is threaded to receive an extractor fitted thereon.

* * * * *